(12) United States Patent
Kondo et al.

(10) Patent No.: US 6,604,177 B1
(45) Date of Patent: Aug. 5, 2003

(54) COMMUNICATION OF DISSIMILAR DATA BETWEEN LOCK-STEPPED PROCESSORS

(75) Inventors: Thomas J. Kondo, Santa Clara, CA (US); James S. Klecka, Georgetown, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 193 days.

(21) Appl. No.: 09/676,403

(22) Filed: Sep. 29, 2000

(51) Int. Cl.[7] .............................................. G06F 12/00
(52) U.S. Cl. ........................ 711/150; 711/202; 714/11
(58) Field of Search ................................. 711/147, 150, 711/152, 202; 714/11

(56) References Cited

U.S. PATENT DOCUMENTS

| | | | |
|---|---|---|---|
| 4,176,258 A | 11/1979 | Jackson ....................... 371/302 |
| 4,541,094 A | 9/1985 | Stiffler et al. .................. 371/68 |
| 4,723,245 A | 2/1988 | Leslie .......................... 371/37 |
| 4,843,608 A | 6/1989 | Fu et al. ....................... 371/68 |
| 5,574,849 A | * 11/1996 | Sonnier et al. ............... 714/12 |
| 5,675,579 A | * 10/1997 | Watson et al. ............... 370/248 |
| 5,675,807 A | * 10/1997 | Iswandhi et al. ........... 710/260 |
| 5,689,689 A | * 11/1997 | Meyers et al. .............. 709/400 |
| 5,748,873 A | * 5/1998 | Ohguro et al. ................. 714/11 |
| 5,751,932 A | * 5/1998 | Horst et al. .................... 714/12 |
| 5,751,955 A | * 5/1998 | Sonnier et al. ................ 714/12 |
| 5,790,776 A | * 8/1998 | Sonnier et al. ............... 714/10 |
| 5,838,894 A | * 11/1998 | Horst ........................... 714/11 |
| 5,867,501 A | * 2/1999 | Horst et al. .................. 370/474 |
| 5,914,953 A | * 6/1999 | Krause et al. ............... 370/392 |
| 5,964,835 A | * 10/1999 | Fowler et al. ............... 709/216 |
| 6,151,689 A | * 11/2000 | Garcia et al. ................. 714/49 |
| 6,157,967 A | * 12/2000 | Horst et al. ................... 710/19 |
| 6,233,702 B1 | * 5/2001 | Horst et al. .................. 714/48 |
| 6,393,582 B1 | * 5/2002 | Klecka et al. ................. 714/11 |

* cited by examiner

*Primary Examiner*—Kevin Verbrugge

(57) ABSTRACT

A processing system includes a pair of processor coupled in a lockstep arrangement. The pair of processors is coupled to a storage element that is external to the both of them. Each processor executes an instruction stream that is identical to that executed by the other. Dissimilar information can be exchanged between the processors by each writing the information they wish to exchange to a first storage location with identical instructions. Although both processors execute the write with the same address, the information written by one of the processors is redirected to a second storage location. Each processor then reads the first and second storage locations to retrieve information supplied by the other processor. Now each processor has a copy of the other's data while staying in lockstep.

17 Claims, 5 Drawing Sheets

COMMUNICATION OF DISSIMILAR DATA BETWEEN LOCK-STEPPED PROCESSORS

BACKGROUND OF THE INVENTION

The invention relates generally to fault tolerant processing systems using at least a pair of lock-step processors for error-checking, and more particularly to a method, and apparatus implementing that method, of passing dissimilar information between the lock-stepped processors. Among the important aspects of fault-tolerant architecture are (1) the ability to tolerate a failure of a component and continue operating, and (2) to maintain data integrity in the face of a fault or failure. The first aspect often sees employment of redundant circuit paths in a system so that a failure of one path will not halt operation of the system. Both aspects may use self-checking circuitry, which often involves using substantially identical modules that receive the same inputs to produce the same outputs, and those outputs are compared. If the comparison sees a mismatch, both modules are halted in order to prevent a spread of possible corrupt data. Examples of self-checking may be found in U.S. Pat. Nos. 4,176,258, 4,723,245, 4,541,094, and 4,843,608.

One particularly strong form of self-checking error detection is the use of processor pairs (and some of the associated circuitry) operating in "lockstep" to execute an identical or substantially identical instruction stream. The term lockstep refers to the fact that the two processors execute identical instruction sequences, instruction-by-instruction. According to this technique, often referred to as a "duplicate and compare" technique, the processor pair receives the same input information to produce the same results. Those results are compared to determine if one or the other encountered an error or developed a fault. The strength of this type of error detection stems from the fact that it is extremely improbable that both processors will make identical mistakes at exactly the same time.

Fault tolerant designs often also use some form of error correction code to protect the main memory of a processor, providing the processor the ability to take a fail fast approach. That is, when the processor detects an error, it simply stops. Recovery from such an error stop is not the responsibility of the processor; rather, recovery is accomplished at the system level. The only responsibility of the processor is to stop quickly—before any incorrect results can propagate to other modules. The lockstep/compare approach to processor error detection fits nicely with this fail-fast approach. In principle, when a divergence between the lockstep operation of the processors is detected, the processors could simply stop executing.

As integrated circuit technology has advanced, more and more circuitry can be put on an integrated chip. Thus, on-chip processors (microprocessors) are capable of being provided very large cache memories that bring with them the advantage of fewer main memory accesses. However, such cache memories are subject to soft (correctable) errors produced, for example, by Alpha particle emissions and cosmic-ray induced errors. Accordingly, it is common to find such caches protected by error correcting codes. Otherwise, the error rate of these on-chip memories would cause processor failures at a rate that is not tolerable, even by non-fault-tolerant system vendors. The error correcting codes allow the processor to recover from these soft (correctable) errors in much the same way as main-memory ECC have allowed most soft memory errors to be tolerated. However, this gives rise to a nasty side-effect in lockstepped designs: The detection and recovery from a correctable cache error will usually causes a difference in cycle-by-cycle behavior of the two processors (a divergence), because the soft error occurs in only one of the two devices.

One solution to this problem is to have the error correction logic always perform its corrections in-line (a.k.a. in "zero time"), but this approach can require extra circuitry in the access path, resulting in slower accesses even in the absence of the error. This approach, therefore, is often deemed unacceptable for high speed designs because of the associated performance penalty.

Another approach is to present any detection of divergence between the two processors to the software as an interrupt, and the processors keep running. The software determines whether the divergence is due to a recoverable soft error or to a "true" divergence due to a miscomputation by one of the processors. If the error is deemed recoverable, necessary state is saved to memory, the microprocessors are reset and brought back into lockstepped operation, the state is restored from memory, and computation resumes from the point of interrupt. If the error is deemed not recoverable, then the software just halts. An, example of this approach can be seen in U.S. application Ser. No. 09/201,635, now U.S. Pat. No. 6,393,582, assigned to the assignee of the invention described and claimed herein. However, this approach requires the cycle by cycle of the processors to be halted, the error checked, and the system restarted if necessary. For processor systems incorporating very large cache memories, as are becoming available today, that continual halting for the expected many soft/correctable errors can be unacceptable.

Soft errors encountered on cache accesses can be self-correcting with today's error correcting codes, as indicated, with no visible time loss. There is no divergence during the soft error recovery. They do not require a reset to recover. However, it is good practice to log each occurring error (i.e., record the memory address at which the error occurred, and track how many times this memory address experiences errors) and to "scrub" the memory location. ("Scrubbing" a memory location is a read of the memory location, followed by writing back to the memory location the value just read therefrom, followed by another read. In this way the memory location experiencing an error is checked to see if the error was transitory, i.e., a soft and correctable error.) The procedure of scrubbing a correctable memory error that is encountered by one, but most likely not the other, of a pair of lockstep processors would cause them to diverge onto to different code paths, resulting in a detection of divergence between them, and most likely causing them to halt.

Thus, it can be seen that a way to provide lockstep processors with the ability to handle soft error logging and scrubbing without resorting to a reset operation or a divergence is needed.

SUMMARY OF THE INVENTION

The present invention provides a simple, effective technique for allowing lockstep processors to handle a correctable memory error in one of the lockstepped processors. The invention provides a simple method that allows the processors to exchange dissimilar information without diverging to the identical instruction streams they are executing.

Broadly, according to the present invention, a pair of lockstep processors, executing an identical instruction steam will include conventional error-correcting circuitry that detects memory errors encountered when reading cache, corrects the error (if correctable), and logs to a status register such each correctable memory error, recording such information as the memory location at which the error occurred and how many times correctable errors are encountered over some set period of time. The address of each memory location at which an error is encountered is written to an error address register. At predetermined points in time, the lockstep processors will read the content of the status register, and write that content to an address identifying a first storage location of a storage unit external to the processors. However, the write address used by one of the processors is redirected (during the write operation) to a second storage location of the storage unit, resulting in the content of the status registers of each of the lockstep processor being stored. Then, the processors read both of the storage locations just written sequentially. During the read operations, the address used by the other processor is not redirected. Thereby, the content of the status register of each of the lockstep processors has been provided to the other of the lockstep processors. Then, the processors read both of the storage locations just written sequentially. During the read operations, the address used by the other processor is not redirected. Thereby, the content of the status register of each of the lockstep processors has been provided the other of the lockstep processors.

In a further embodiment of the invention, the lockstep processors go through an identical code sequence to check and see if the status registers indicate that soft errors were encountered. If so, the lockstep processors go through the same procedure described above to exchange the contents of their respective error address registers, thereby providing each with the memory locations that have experienced correctable errors and need to be purged. The lockstep processors proceed to purge each such memory location, regardless of whether it is needed by the particular processor or not. A timer is then reset to establish the next error-recording period.

There are a number of advantages achieved by the invention. Lockstep processors are capable of handling soft error recovery without diverging code execution resulting in having to utilize a reset recovery.

These and other aspects and advantages of the present invention will become apparent to those skilled in this art upon a reading of the following description of the specific embodiments of the invention, which should be taken in conjunction with the accompanying drawings.

DESCRIPTION OF THE SPECIFIC EMBODIMENTS

Figure 1:
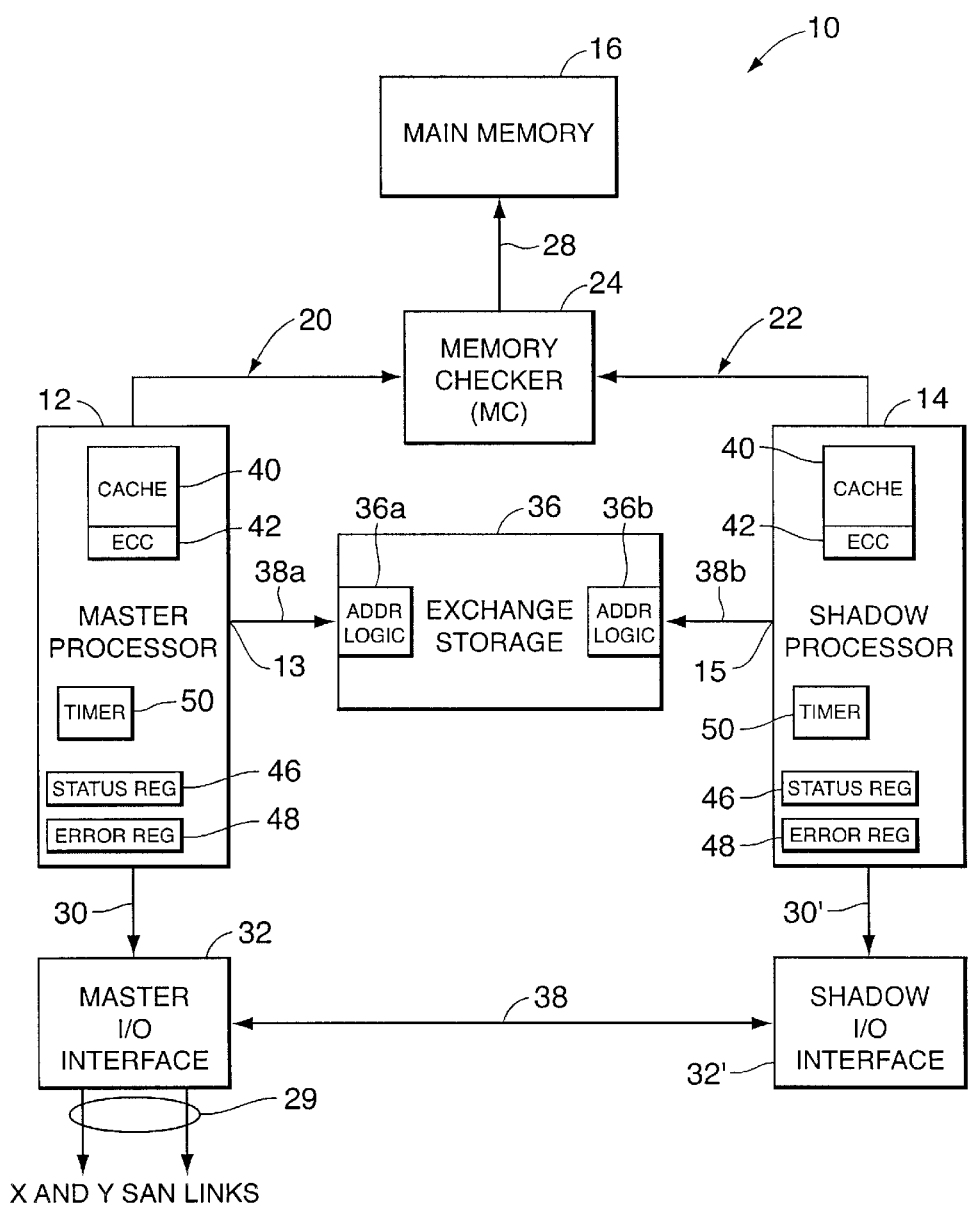
FIG. 1 is a block diagram of a processing system, broadly showing a pair of processors in a lockstep and compare arrangement and employing the present invention.

Turning now to the figures, and for the moment specifically FIG. 1, there is illustrated a processing system designated with the reference numeral 10. As FIG. 1 shows, the processing system 10 includes a pair of processors ("master" and "shadow") 12, 14 coupled to a main memory 16 by data/address busses 20, 22, respectively, through a memory checker (MC) 24 and a memory bus 28. Input/output (I/O) information is communicated from the master processor 12 to a pair of system area network (SAN) links 29 via an I/O bus 30 and a master I/O interface 32. The shadow processor is similarly coupled to a shadow I/O interface 32' by an I/O bus 30', but the shadow I/O interface does not connect a SAN. Rather, a bus 38 connects the two I/O interfaces 30, 30' for cross-checking as discussed further below.

Each of the processors 12, 14 had a port 13, 15, respectively, that connects to a address logic 36a, 36b of an exchange storage 36 by a byte-wide bus 38a, 38b.

Each of the processors 12, 14 includes a cache memory 40 with associated error-correcting circuitry 42. The error-correcting circuitry uses conventional coding of the data words stored in the cache 40 to correct "soft" (1-bit), and detect 2-bit errors. For tracking soft errors detected and corrected by the error-correcting circuitry 42, each error is counted by the error-correcting circuitry 42 and logged to a status register 46. And, an error address register 48 is used by the error-correcting circuitry 42 to record the memory location(s) of the cache 40 at which each such errors occurs. Periodically, the status register is check to see if any errors have been encountered within a predetermined period of time, and if so, the content of the error address register 48 is used to "scrub" the memory location(s) at which the error(s) occurred. (Scrubbing is a read-writeback-read operation to ensure that the error encountered was transitory.) The predetermined period is measured by a timer 50, which is preferably a software timer, but could also be a hardware timer.

The processors 12, 14 are included in a lockstep and compare design so that each executes an instruction stream that is identical to that executed by the other. Accordingly, the shadow processor 14 will execute, cycle by cycle, each instruction executed by the master processor 12, making the same memory accesses as the master processor 12, and issuing the same output data to the shadow I/O interface 32' as the master processor does to the master I/O interface 32. Incoming data received from the SAN links 29 is provided to the shadow processor 14 via the bus 38. I/O output data from the shadow processor 14 is checked by the master I/O interface 32 against that same data from the master processor 12 to ensure that the two processors remain in lockstep operation. Only the output I/O data from the master processor 12 is transmitted to the SAN links 29 by the master I/O interface.

Similarly, when the master and shadow processors 12, 14 write to main memory 16, only the information supplied by the master processor 12 is used; the information from the shadow processor 14 is compared against that of the master processor 12 by the memory checker 24 to again ensure that the master and shadow processors 12, 14 continue to be proceeding along the same instruction sequence of the instruction stream they are executing.

Preferably, to avoid or at least reduce timing problems, the shadow processor 14 will operate a clock or two behind the master processor 12. Thus, the memory checker 24 will include storage to buffer the last few writes of the master processor 12 for comparison with the writes later produced by the shadow processor 14. Any miscompares noted by either the memory checker 24 or the master I/O interface 32 will result in halt of further I/O outputs and memory accesses to allow at least the master processor 12 time to examine the problem in order to decide how best to handle it, i.e., to decide whether the detected divergence is recoverable, or should the system 10 be halted. One approach to handling such divergences is taught in the above-referenced U.S. patent application Ser. No. 09/201, 635.

The master and shadow processors each have a byte-wide port 13, 15, respectively, that, according to the present invention is coupled by busses 38a, 38b to the address logic 36a, 36b of an exchange storage 36. In a manner that is described below, the exchange storage provides a tool that allows the master and slave processes to exchange dissimilar data without the processors having to diverge from the instruction stream; that is, while executing the same instructions, the master and slave processors can exchange information, and act upon that information, in identical manner. Exchange storage includes a number of storage locations, which may be memory locations or registers of, for example, a register file, whereat the information to be exchanged is placed.

Although the exchange storage is shown as a separate element, it will be apparent that it could be included in the memory checker 24, or even on the I/O interfaces 32, 32'. Alternatively, the main memory could be used to temporarily store information being exchanged, but that creates additional design and performance problems because of the memory checker's compare functions.

Figure 2:
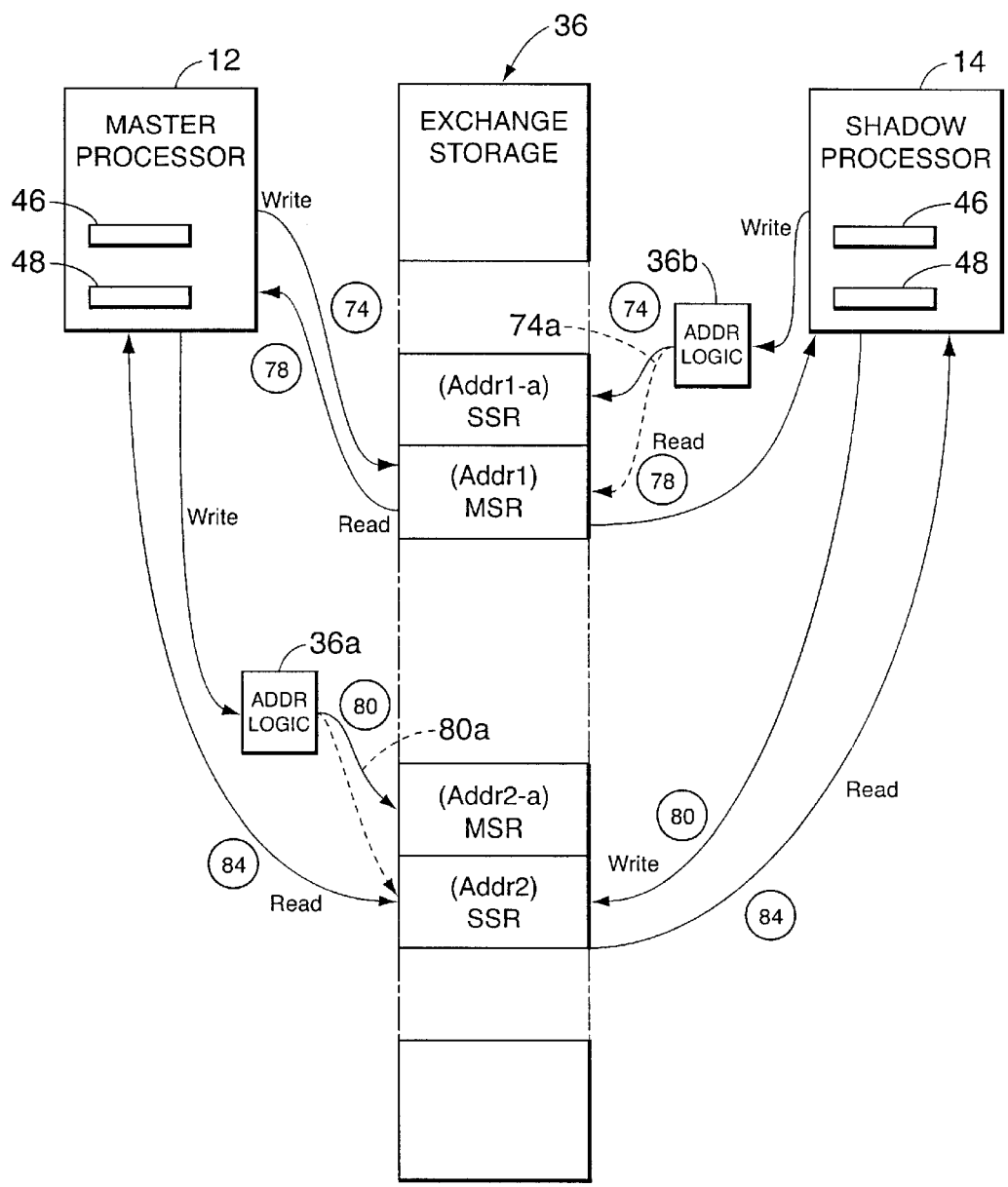
FIG. 2 is a diagrammatic representation of an exchange of dissimilar information between the lockstep processors of FIG. 1 according to one embodiment of the present invention.
Figure 3:
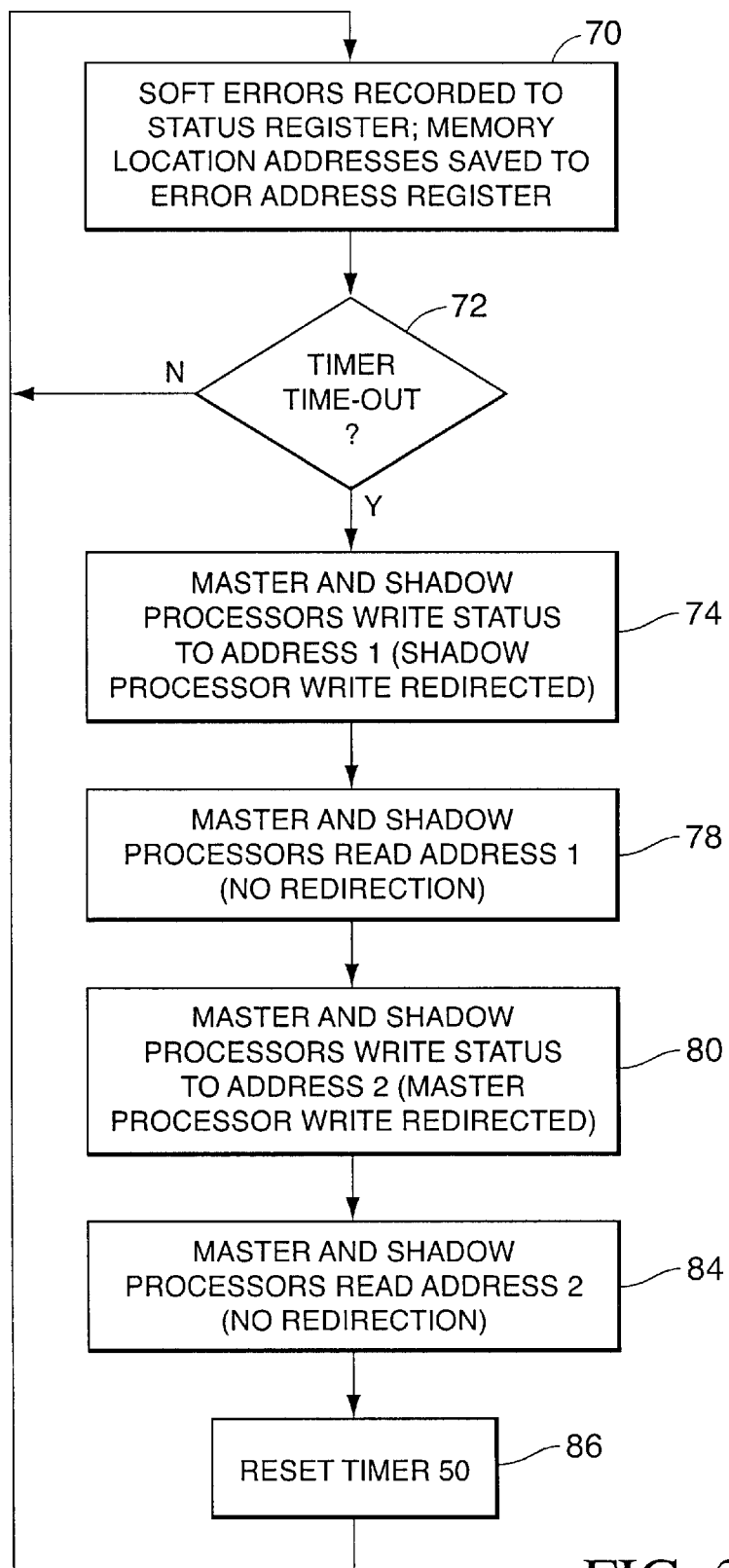
FIG. 3 is a flow diagram identifying the main steps taken by the lockstep processors to make an information exchange according the embodiment of FIG. 2.

One approach to information exchange between the processors 12, 14, according to the present invention, is diagrammatically illustrated in FIG. 2, and the major steps of the procedure followed is shown in FIG. 3. The reference numerals used in FIG. 3 are also used in FIG. 2 to correlate the steps of the procedure with the diagrammatically illustrated act in FIG. 2.

Referring to FIGS. 2 and 3, and for the moment specifically FIG. 3, during execution of their respective (identical) instruction streams, the error-correcting circuitry 42 of the master and slave processors most likely will be encountering soft memory errors, and logging those errors to the status and error address registers 46 and 48 (step 70). At the same time, the cache memory address at which the error occurred is saved to the error address register by hardware for later examination and scrubbing. In step 72 the processors monitor the timer 50 (FIG. 1) to determine if a preset time period has expired. If not, the procedure returns to (remains with) step 70. If, however, the timer 50 has timed out, the procedure will proceed to step 74, where the master and shadow processors 12, 14 will retrieve the contents of their own status register. Then, they both write that content to the exchange storage 36 at an Address 1 (Addr1) via the address logic 36a, 36b. The content of the status register ("MSR") 46 written by the master processor 12 actually finds its way to the location in the exchange storage 36 identified by Addr1. However, the content of the status register 36 ("SSR") of the shadow processor 14 is redirected (as indicated at 74a) by the address logic 36b to a location in the exchange storage 36 with an address Addr1-a.

Then, at step 78, the master and shadow processors 12, 14 both read the location at Addr1. This time the address supplied the address logic 36b by the shadow processor 14 is not redirected, so both the master and the shadow processors read, and store for later examination, the content of the location at Addr1 of the exchange storage 36: the error count developed by the master processor, MSR.

Step 80 sees the master and shadow processors doing essentially the same thing, except that now they write to a location of the exchange storage, using an address Addr2. The content of the status register of the shadow processor ("SSR") is written to the location Addr2. However, this time is the address supplied by the master processor 12 that is redirected by the address logic 36a—to a location at address Addr2-a. Then, both the master and shadow processors read the location at Addr2, with no redirection (step 84). At the conclusion of step 84, the master and slave processors each have the content of the status register of the other (as well as their own), using a procedure in which they each executed the same instructions, in lockstep, to exchange dissimilar data.

The timer 50 maintained by both processors, for establishing the period for making the exchange of their respective status register contents, is then reset at step 86, and both return to normal operation again tracking any soft errors that may occur when accessing their respective cache memories 40.

The procedure described above with the aid of FIGS. 2 and 3 are primarily for explanation. A preferred method of exchanging information is diagrammatically illustrated in FIG. 4. Whereas in the procedure of FIGS. 2 and 3, each of the master and shadow processors 12 and 14 performed two writes and two reads, the procedure diagrammed in FIG. 4 requires the processors to each write only once and read twice.

Figure 4:
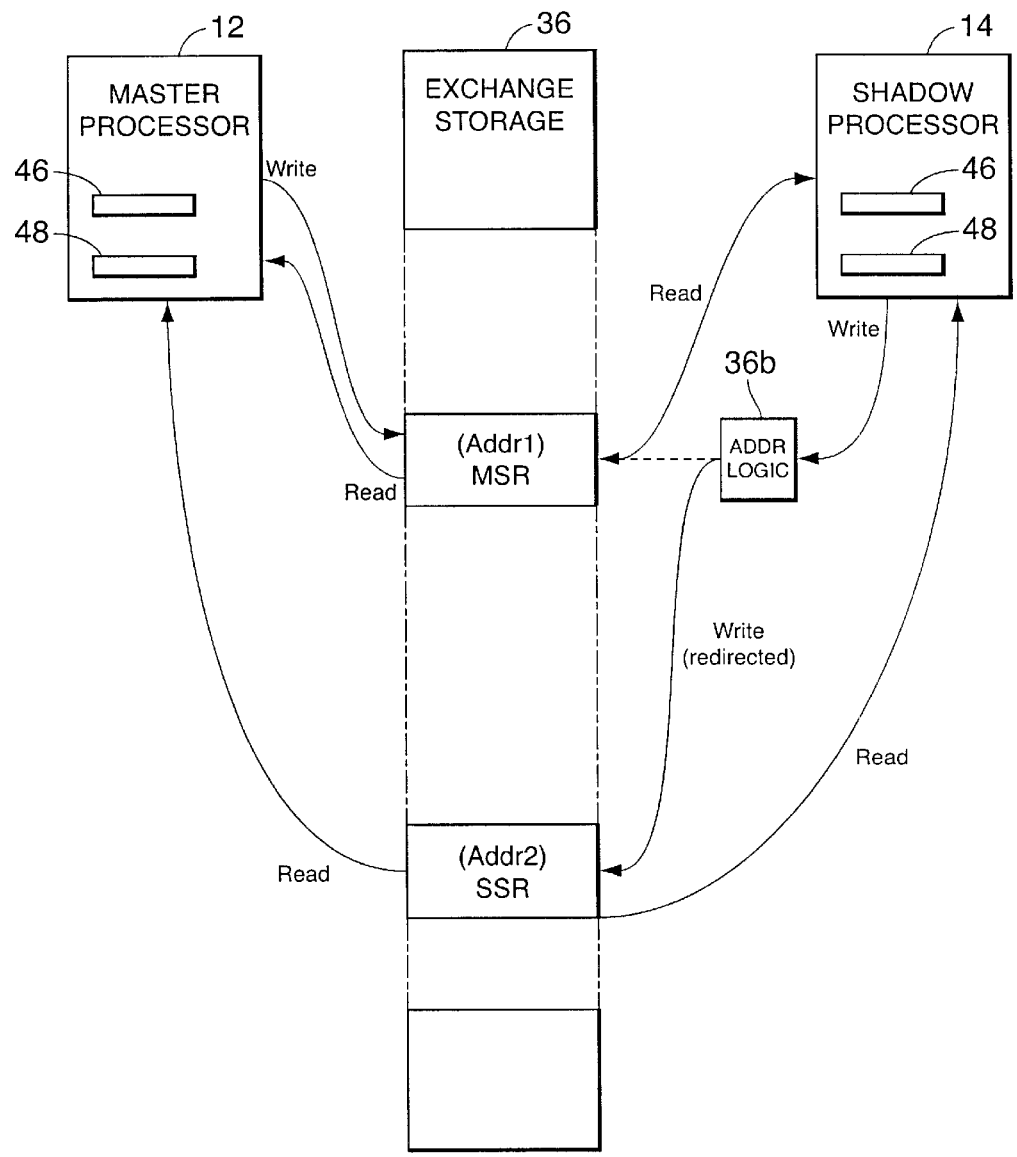
FIG. 4 is a diagrammatic representation of an alternate technique for information exchange between the lockstep processors according to another embodiment of the invention.

Referring, then, to FIG. 4, as before, when the timer 50 (FIG. 1) times out in each of the master and shadow processors 12, 14, the processors will beginning executing the procedure of FIG. 3, with the modifications shown in FIG. 4: Each processor 12, 14 will, as before, read its respective status register 46, and write the content (MSR for the master processor 12; SSR for the shadow processor 14) to an location of the exchange storage 36 with an address Addr1. Remember that both processors 12, 14 are operating in lockstep, so to prevent divergence, the address for this first write must be the same, i.e., Addr1. However, the address logic 36b will redirect the write of SSR from the shadow processor 14 to the location having address Addr2 as indicated in FIG. 4.

At this point the contents of the status register 46 (MSR) of the master processor 12 is saved to the location Addr1 of the exchange storage 36, while the content of the status register 46 (SSR) of the shadow processor is saved to the location Addr2, even though written to the address Addr1. Now, the two processors 12, 14 with both sequentially read the locations Addr1 and Addr2, retaining read content (MSR and SSR) for later examination and use—to be described.

Thus, there has been described two similar techniques for allowing a pair of processors in lockstep and compare operation to exchange dissimilar information. One (described with reference to FIGS. 2 and 3) uses two write and two read operations by each of the pair of processors, with the address logic 36a, 36b of the exchange storage 36 each performing one address redirection operation. The second technique (FIG. 4) uses only one write operation by each processor, followed by the two reads, and one redirection, to make the exchange.

Figure 5:
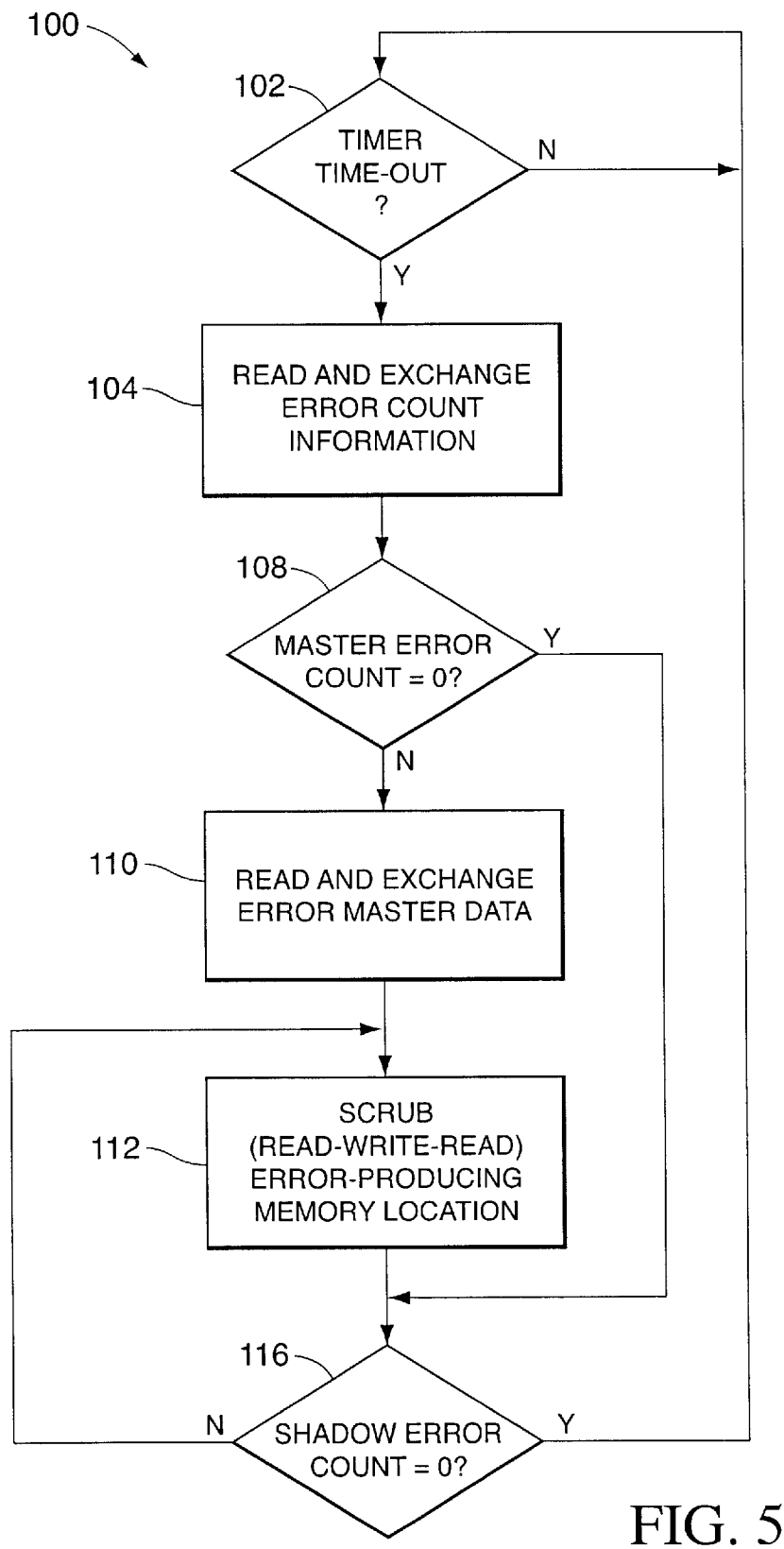
FIG. 5 is a flow diagram illustrating the main steps taken to check for prior occurrences of correctable errors, using information exchanged according to the present invention, to scrub any memory locations that have experienced such errors.

Turning now to FIG. 5, there is shown a flow chart 100, broadly illustrating the steps taken to scrub any memory errors encountered during any one of the time periods defined by the timer 50. Thus, when the time times out (step 102; comparable to step 72 of FIG. 3), operation of the master and shadow processors 12, 14 (FIG. 1) will move to step 104 where, using the present invention, the processors will exchange the content of their respective status registers. When this is done, and the processors 12, 14 now have the error count, if any, of the other processor recorded since the last time-out of timer 50, they will check first the error count of the master processor 12 as recorded in the value MSR. (Although the processors may know that the values MSR and SSR pertain to the error counts of a master and a shadow processor, respectively, they do not know that they are the master or shadow processor—nor do they need to know. In fact, if one thinks about it, they do not need to know that one of the other value pertains to a master or a shadow processor. All that is important is the value.)

If, the check at step 108 finds that the value MSR is zero, i.e., the master processor experienced no soft errors reading the cache during the last time period, the procedure will jump to step 116, where the SSR value is similarly checked. If, however, the MSR value is found to be non-zero, indicating that one or more errors were encountered during the last time period, the procedure will move to stop 110. In step 110, the master and shadow processors exchange the content of their respective error address registers 48, containing as indicated above the address(es) of the cache memory locations at which the soft errors were encountered as recorded by the MSR, SSR values.

With each of the processors 12, 14 now in possession of the addresses of the other addresses at which soft errors occurred (as well as their own), the procedure now moves to step 112 to scrub the memory locations of the cache 40 of the master processor 12. Again, the processors 12, 14 may not know which one is the master and which one is the shadow, but they may know which value that they have is the master's addresses and the shadow's addresses. According, each, again in lockstep unison, will sequence through the address values for the master processor 12 to perform first read the memory location, write that same value back to the memory location, and read it again. If no errors are experienced during this operation, the memory location is considered scrubbed, and the next memory location, if any, will similarly be scrubbed. This scrubbing operation will continue until all the memory locations indicated by the addresses obtained from the address register 48 of the master processor 12 have been scrubbed. The procedure will then exit step 112 in favor of the step 116.

Note that although the scrubbing operation of step 112 applies only to the memory locations experienced by only one of the processors at this point in time, since they are performing the scrub operation in lockstep harmony, it will also be performed to memory locations that most likely did not have memory errors. However, it will be seen that this does no harm and is necessary to maintain lockstep.

At step 116, the master and slave processors now check the SSR values they have. If zero, the procedure returns to wait until the timer 50 again times out, returning to other processing. If, on the other hand, the value is not-zero, the memory locations pertaining to that value must be scrubbed. Accordingly, the procedure returns to step 112 (since the processors have already exchanged the address information needed in step 110) to scrub the memory location or locations experienced by the shadow processor 14. When the scrub operation is completed, the SSR value is zeroed so that when the procedure returns to step 116, is will be directed to step 102 to await the next timeout of the timer 50.

In summary, there has been disclosed a method, and apparatus for implementing that method, that permits a pair of processors operating in lockstep to exchange dissimilar information between them without the necessity of diverging from the instruction stream they are executing.

What is claimed is:

1. In a processing system that includes two processor units each executing identical instructions of instruction streams at substantially the same time, a method of exchanging data between the two processor units, comprising:

writing the data to a first storage location with a first address;

redirecting the first address used by one of the two of processor units to a second address;

reading the content of the first storage location with the first address.

2. The method of claim 1, further comprising:

providing a main memory having a plurality of storage locations accessible to each of the two processor units.

3. The method of claim 2, wherein the first storage location is one of the plurality of storage locations.

4. The method of claim 2, further comprising:

providing a second memory element having the first memory location.

5. The method of claim 4, wherein the second memory element is a, register.

6. The method of claim 1, wherein the two processor units operate in lockstep synchronism to execute the identical instruction streams.

7. A processing system, comprising:

first and second processor units coupled for lockstep operation to execute identical instruction streams;

a storage facility having at least first and second storage locations;

a first instruction in the identical instruction streams to respectively cause each of the first and second processor units to write data to the first storage location;

means for redirecting the data from the second processor unit to the second storage location; and a second instruction in the identical instruction streams to respectively cause each of the first and second processor units to read the first and second storage locations, whereby, the first and second processor units exchange data between them.

8. The processing system of claim 7, further comprising:

a main memory accessible to the first and second processor units, wherein the storage facility forms a part of the main memory.

9. A processing system, comprising:

first and second processor units operating in lockstep to execute substantially identical instruction streams, instruction by instruction;

a main memory shared by the first and second processor units for storing and retrieving data words, each of the data words being protected by error correcting code; and error correcting circuitry operating to correct errors in data words accessed at the main memory, wherein the first and second processor units are coupled for exchanging information respecting error counts.

10. A method for exchanging data between two processors engaged in lockstep and compare operations, each of the two processors being associated with a status register, the method comprising:

writing to a first address, by each of the two processors, contents of their associated status register, the first address used by a second of the two processors being redirected to render it different than the first address used by the first of the two processors;

reading, by the two processors, data at the first address;

writing to a second address, by each of the two processors, contents of their associated status register, the second address used by the first of the two processors being redirected to render it different than the second address used by the second of the two processors; and reading, by the two processors, data at the second address, whereby the two processors are able to exchange dissimilar data without having to diverge from their instruction stream.

11. A method as in claim 10, wherein the contents of each status register includes logged soft memory errors.

12. A method as in claim 10, wherein upon reading the data at the first and second addresses each of the two processors are in possession of addresses, logged by both of them, at which soft memory errors occurred.

13. A method as in claim 12, further comprising:

scrubbing the addresses at which the soft memory errors occurred.

14. A method for exchanging data between two processors engaged in lockstep and compare operations, each of the two processors being associated with a status register, the method comprising:

writing to a first address, by each of the two processors, contents of their associated status register, wherein the content of the status register associated with a second of the two processors is redirected and stored in a second address; and reading, by the two processors, data at the first and second addresses, whereby the two processors are able to exchange dissimilar data without having to diverge from their instruction stream.

15. A method as in claim 14, wherein the contents of each status register includes logged soft memory errors.

16. A method as in claim 14, wherein upon reading the data at the first and second addresses each of the two processors are in possession of addresses, logged by both of them, at which soft memory errors occurred.

17. A method as in claim 16, further comprising:

scrubbing the addresses at which the soft memory errors occurred.

\* \* \* \* \*